June 24, 1924.
D. B. WHISTLER
TRACTOR WHEEL
Filed May 24, 1920
1,498,825
2 Sheets-Sheet 1
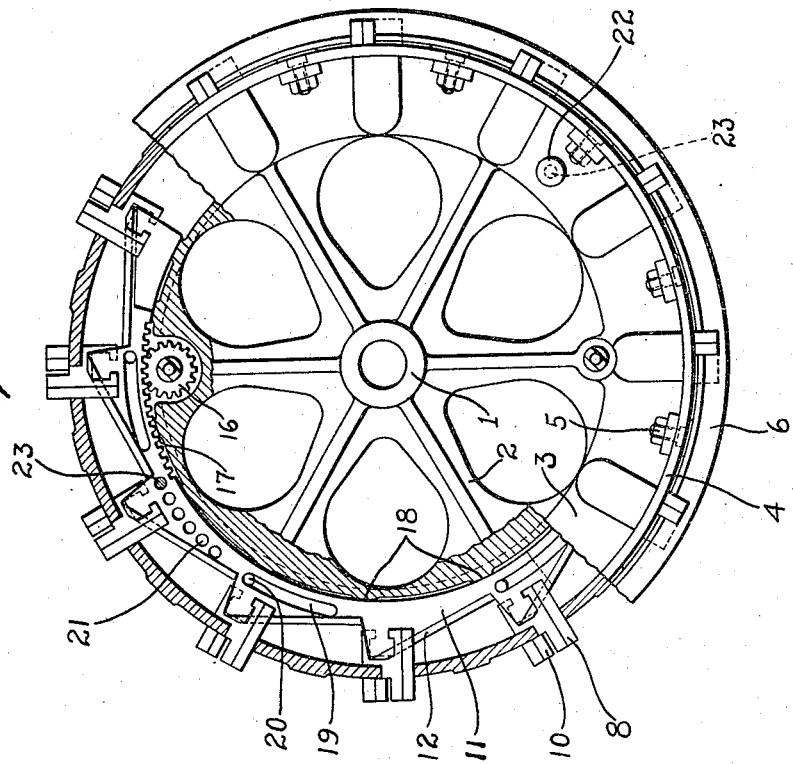
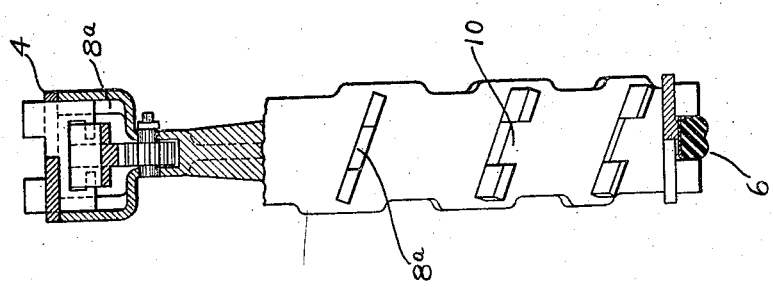
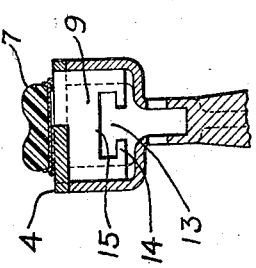
INVENTOR.
BY D. B. Whistler
ATTORNEYS.

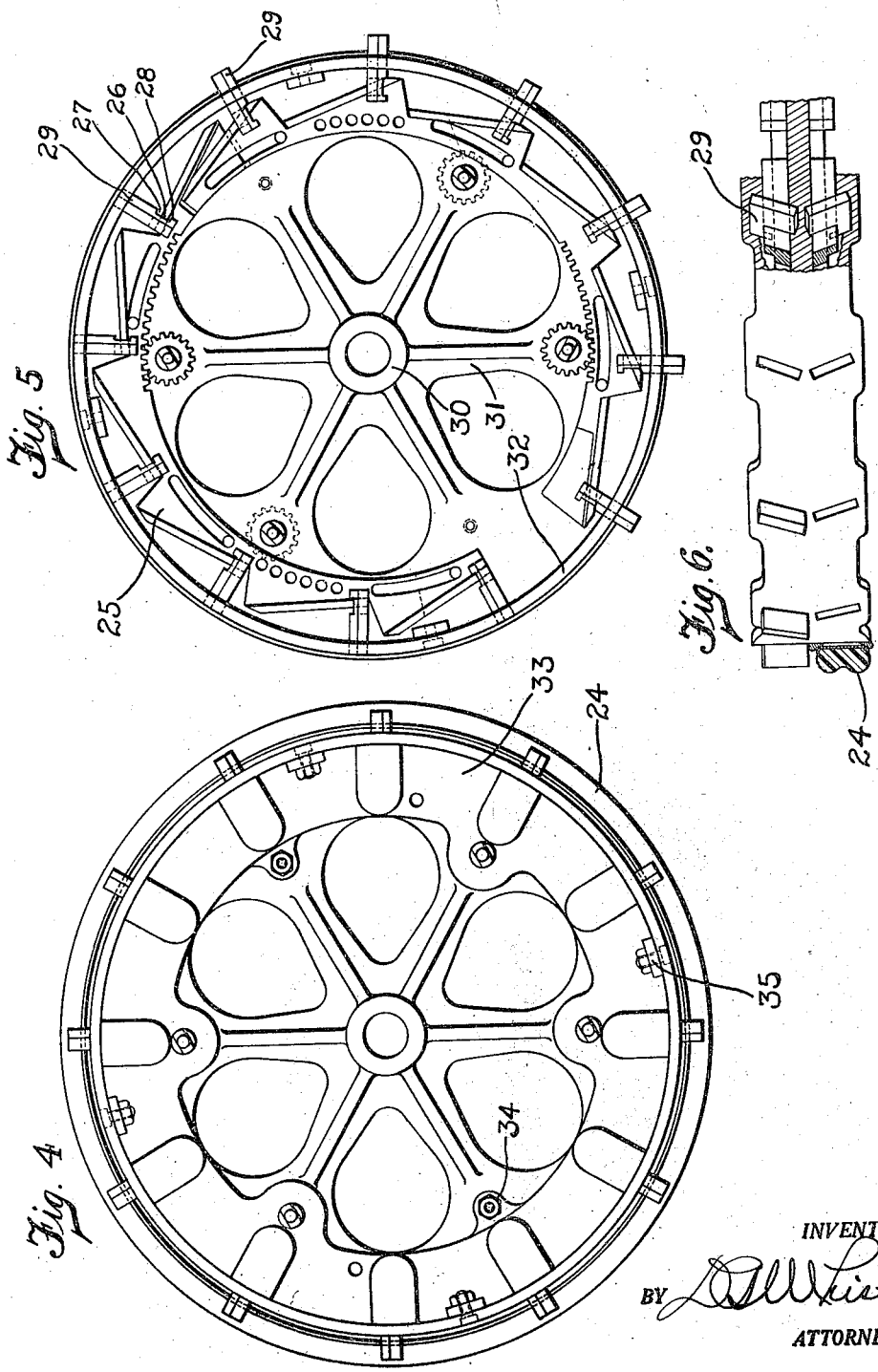

Patented June 24, 1924.

1,498,825

UNITED STATES PATENT OFFICE.

DAVID B. WHISTLER, OF DAYTON, OHIO.

TRACTOR WHEEL.

Application filed May 24, 1920. Serial No. 383,805.

*To all whom it may concern:*

Be it known that I, DAVID B. WHISTLER, a citizen of the United States, residing at Dayton, in the county of Montgomery and State of Ohio, have invented certain new and useful Improvements in Tractor Wheels, of which the following is a specification, reference being had therein to the accompanying drawings.

This invention relates to tractor wheels being a further development and improvement of the invention which constitutes the subject matter of my copending application for patent Serial No. 364,294, filed March 8, 1920.

The main object of the present invention is to provide an improved tractor wheel having adjustable cleats or tread plates adapted to be variably adjusted relative to the rim of the wheel, and means whereby a number of the tread plates, preferably half the number required for the wheel, may be adjusted and set or locked in the various adjusted positions by a common adjusting and locking mechanism.

It is an object of the invention to provide improved mechanism adapted to accomplish the above result, which will be of simple, substantial construction, which will withstand the hard usage to which wheels of this character are subjected, and which will in all respects be practicable to serve the purposes of the invention.

The problem of the tractor, as applied to farm operation, is largely a question of adaptability of the power apparatus to the character and variable conditions of the work. Thus, for field work, the tractor must be readily adaptable to the variable conditions of the ground, especially to cultivated ground. For hauling, the tractor must be equally adaptable to variable road conditions, as the changeable conditions of dirt roads, and the various kinds and conditions of built roads.

With these conditions and requirements understood, it is obvious that the adaptability of the farm tractor to the variable conditions under which it must be operated, is largely a question of suitable wheel construction whereby provision is made to readily adapt the wheels to the conditions of the ground or road over which the tractor is to be operated.

Thus, in the present invention effective means are provided whereby the wheels may be readily converted into tractor wheels, variably adjustable to suit the conditions of the ground over which the tractor is to be worked, or into smooth-tread or rubber-tired wheels to adapt the tractor for operation on the roads.

Thus for road work, having particular reference to operation of tractors on modern paved roads, the present invention goes a step farther than what is contemplated in my earlier invention herein referred to, in that provision is made to adapt the tractor wheels to be equipped with demountable, resilient tires, such as solid rubber or cushion tires, or even pneumatic tires, which may be used either in connection with or independently of the adjustable tread plates.

Thus for field work, the demountable tires may be removed from the wheels, in order that the full effect of the tractor wheel may be obtained, or the tires may remain on the wheels and be used in connection with the tread plates under certain conditions of operation. For road operation, as above stated, the tires may be used either independently of or in connection with the tread plates as may be desired by the operator.

This arrangement of combined tractor and resilient tread wheel is particularly advantageous for the equipment of military trucks which must operate over all conditions of roads and fields, or for sugar plantation trucks, etc., where the trucks are operated in the fields to gather the crop and are then driven over the roads to deliver their load to the mill.

It is, therefore, the main object of this invention to provide a tractor wheel of dependable construction which will be adaptable to the variable normal and even the extreme conditions of operation of both field and road and which will withstand, without being subject to breakage or being rendered out of adjustment, the rough usage which wheels of this character receive.

To effect neatness of appearance and to minimize the accumulation of mud or loose ground relative to the tread plate adjusting mechanism, the wheel of the present invention is carefully designed, the operable parts being enclosed in a suitable casing which is more or less of self-cleaning character and which serves to exclude the coarse dirt and grit from the operable mechanism. It will be observed, however, that the mechanism is of a character which will not readily be affected by the ordinary accumulation of dirt of which there is always more or less in machinery of this character.

In the drawings;

Fig. 1 is a side elevation of the improved tractor wheel having a portion of the metal broken away;

Fig. 2 is a face elevation of the wheel shown in Fig. 1, having parts broken away;

Fig. 3 is a detailed sectional view of a modified construction of the wheel shown in Fig. 1;

Fig. 4 is a side elevation of a wheel of modified construction;

Fig. 5 is a side elevation of the wheel shown in Fig. 4 having one side of the tread plate housing removed, and Fig. 6 is a face elevation of the wheel shown in Figs. 4 and 5 having a portion of the metal broken away.

As shown in Figs. 1, 2 and 3, the inner portion of the wheel consists of the hub 1, spokes 2 and tread plate casing 3 having a series of tread plate housings 3ª; this part of the wheel being integrally cast and having the rim 4 secured thereto by bolts 5. It will be understood, of course, that the construction here shown is for the purpose of illustrating the invention only, and that the wheel with respect to these features may be of any suitable construction to meet the requirements of the invention.

The cushion tires 6 and 7, as here shown in connection with Figs. 1 and 2 and Fig. 3 respectively, may be secured to the rim 4 in any suitable manner, the usual practice of mounting tires being followed in this respect with such modifications only as will adapt the mounting means to the novel construction of the wheel. As shown in Figs. 1 and 2, the tire may be used in connection with or independently of the adjustable tread plates 8, but in the modified construction shown in Fig. 3 the tire 7 can be used only independently of the tread plates 9. The plates 8 have a notch or cut-away portion 10 adapted to receive the tire 6 and to permit of adjusting the tread plates relative to the rim 4 and the tire, no provision being made, however, in Fig. 3 for adjustment of the plates 9 when the tire 7 is mounted on the wheel.

As shown in Fig. 1 the tractor wheel is provided with the tread plates 8 which are arranged in a double series, as here shown, of six plates each, the plates being operable in slots 8ª in the rim of the wheel and adjustable radially in both directions in each series by a common cam segment 11, the cams being mounted to operate concentrically of the hub 1, and having inclined cam faces 12 which cooperate by means of open spaces 13 and shoulders 14—15 formed adjacent the lower edge of the plates 8 and 9, whereby the tread plates may be projected or retracted by a single operation.

The means for operating each cam segment, as here shown, consists of a spur gear 16 mounted within the casing 3 and cooperating with a rack 17 of the segment 11. The segments are supported on lugs or pads 18 which are cast with the wheel, and are retained in proper relation thereto by slots 19 provided in the cam segments and guide pins 20 secured in the wheel. Thus the end thrust on the tread plates will be transmitted direct to the solid portion of the wheel without possibility of breakage of intermediate parts, the cam segments being heavy enough to withstand the weight and thrust transmitted therethrough in the operation of the wheel.

Holes 21 adapted to register with a hole 22 in the casing 3 and to be retained substantially in alignment by a pin 23, are provided whereby to effect variable adjustment of the tread plates. Thus the plates may be adjusted to any one of a plurality of positions as may be desired to suit the condition of the ground or road over which the tractor is to be operated, the adjustment of the plates being accomplished by any suitable tool, such as a socket wrench, applied to the projecting hub or shaft 16ª of the gears 16.

The modified wheel construction shown in Figs. 4, 5 and 6 is essentially the same in principle as the construction above described in connection with Figs. 1, 2 and 3, except as to the arrangement for using the demountable tire 24 in connection with the tread plates. As here shown, the wheel is provided with four sets of tread plates, 29, two sets of plates in each opposite half of the wheel, each set being operably controlled by a cam segment 25 cooperating with a notch 26 and shoulders 27 and 28, the operation of the parts being substantially the same as that above described in connection with Figs. 1, 2 and 3.

In the construction shown in Fig. 4 any one of the sets of tread plates may be adjusted independently of the other. Thus provision may be made for mounting the tire 24 on one side or the other of the wheel, either outside or inside the center of the rim, and the tread plates on the opposite side of the rim will be free for adjustment, if desired, to be used in connection with the tire.

A further modification of construction is shown in connection with the wheel illustrated in Figs. 4, 5 and 6 with respect to the hub 30, spokes 31 and rim 32, which are here shown as cast integrally, the housing plates 33 being cast separately and secured to the wheel in any suitable manner as by the bolts 34.

While the wheel illustrated in each of the figures of the drawings is shown as a cast wheel, it will be obvious and understood, of course, that the invention is in no wise limited to a cast wheel construction, as an assembled, or built-up wheel of the usual construction may readily be adapted to have the invention applied thereto by providing suitable means in the rim for supporting and adjusting the tread shoes.

From the foregoing detailed description it will be apparent that my improved tractor wheel is readily adaptable to manufacturing operations whereby cheap production may be accomplished; that the operable parts comprised in the tread plate mechanism are of simple construction and having sufficient strength to withstand the usage the wheel is designed to receive, and that the plates may quickly and easily be adjusted to their variable positions for operation. It will be observed that the improved wheel is readily adaptable to all usual conditions of field or road operation, and that it will be effective to realize the purposes of the invention.

While the invention is here shown in a preferred form of construction, it will be obvious that various modifications relative to the details of construction and arrangement may be made therein without departing from the essential principles, or the substance and spirit of the invention as defined and comprehended in the appended claims.

Having thus fully defined my invention, what I claim is new and desire to secure by Letters Patent is;

1. In a tractor wheel, the combination with the rim of the wheel, a circumferential casing arranged inwardly adjacent said rim and comprising a plurality of housings, a slot formed in the rim adjacent each of said housings, a tread plate operable in the slot within each housing, and a common actuator for said plates operable circumferentially in said casing.

2. In a tractor wheel, the combination with the rim of the wheel, a circumferential casing arranged inwardly adjacent said rim and comprising a plurality of housings, a slot formed in the rim adjacent each of said housings, a tread plate operable in the slot within each housing, and a common actuator operable circumferentially in said casing having connections with said plates whereby to variably adjust the same relative to said rim.

3. In a tractor wheel, the combination with the rim of the wheel, a circumferential casing arranged inwardly adjacent said rim and comprising a plurality of housings, a slot formed in the rim adjacent each of said housings, a tread plate operable in the slot within each housing, and a common actuator for said plates operable circumferentially in said casing and means in said housing to secure the plates as adjusted.

4. In a tractor wheel, the combination with the rim of the wheel, a circumferential casing inwardly adjacent said rim and comprising a plurality of housings, a slot formed in the rim adjacent each of said housings, a plurality of sets of tread plates operable in said casing through said slots, and a common actuator for each set of plates operable circumferentially in said casing.

5. In a tractor wheel, the combination with the rim of the wheel, a circumferential casing inwardly adjacent said rim and comprising a plurality of housings, a slot formed in the rim adjacent each of said housings, a plurality of sets of tread plates operable in said casing through said slots, and a common actuator for each set of plates operable circumferentially in said casing and having positive connections with said plates whereby to adjust the same relative to said rim.

6. In a tractor wheel, the combination with the rim of the wheel, a circumferential housing inwardly adjacent said rim, slots formed in the rim, a tread plate operable in each slot within the housing, and a common actuator operable circumferentially in said housing, and having a positive cam connection with each of said plates whereby to adjust the same relative to said rim.

7. In a tractor wheel, the combination with the rim of the wheel, a circumferential housing inwardly adjacent said rim, slots formed in the rim, a tread plate operable in each slot within the housing, and a common actuator comprising a segment operable circumferentially in said housing, and having a cam connection with each of said plates whereby to adjust the same variable relative to said rim, apertures in said housing and in said plate adapted to be aligned one with the other, and means cooperating with said aperture whereby to secure said plates as adjusted.

8. In a tractor wheel, the combination with the rim of the wheel, a circumferential housing inwardly adjacent said rim, slots formed in the rim, a tread plate operable in each slot within the housing, a common actuator comprising a rack operable circumferentially in said housing, and having a cam connection with each of said plates whereby to adjust the same variably relative to said rim, and a gear mounted in said housing and operatively connected with said rack.

9. A tractor wheel with a rim having a portion adapted to have a tire mounted thereon, and a normally smooth-tread portion, of a plurality of tread plates operably connected with said smooth-tread portion, and adapted to be adjusted relative thereto to form a tractor tread thereon.

10. A tractor wheel with a rim having a portion adapted to have a tire mounted thereon, and a normally smooth-tread portion, of a plurality of tread plates operably connected with said smooth-tread portion, and adapted to be adjusted relative thereto to form a tractor tread of variable degree thereon.

11. A tractor wheel having a rim adapted to support a demountable tire, and means coacting with the rim to effect a tractor tread thereon when said tire is removed therefrom.

12. A tractor wheel having a rim adapted to support a demountable tire, and means coacting with the rim to effect a tractor tread thereon in combination with the tread of said tire when the same is on the rim and irrespective of the tire when the same is removed therefrom.

13. A tractor wheel having a normally smooth-tread rim, a demountable tire supported on a portion of said rim, and adjustable tread plates cooperating with the remaining portion of said rim to form a tractor tread thereon.

14. In a tractor wheel, the combination with an integrally-cast portion of the wheel comprising a peripheral housing, of a plurality of tread plates operable outwardly in said housing, and a detachable portion of the wheel closing said housing and cooperating in the operation of the tread plates.

15. In a tractor wheel, the combination with an integrally cast part of the wheel including the hub and an open housing arranged concentrically thereof, of a tread plate operable in said housing, and the rim of the wheel covering the opening of said housing and having an aperture aligned with the tread plate.

16. In a tractor wheel, the combination with the hub and spokes of the wheel, of a hollow-cast, peripheral housing, a plurality of tread plates operable in said housing, and a detachable rim cooperating with said plates.

17. In a tractor wheel, the combination with an integrally-cast portion of the wheel comprising a housing, a plurality of tread plates operable in said housing, a detachable rim cooperating with said plates, and an operable member mounted on the solid metal of the wheel and having direct connection with a plurality of tread plates whereby the end thrust on the plates will be transmitted through said member direct to the integrally-cast part of the wheel.

18. In a tractor wheel, the combination with a rim having tread plates adjustable relative thereto, of a tire adapted to be mounted on said rim when the tread plates are in one of said adjusted positions.

19. A tractor wheel having a rim adapted to have a resilient tire mounted thereon, and having tread plates adjustable, relative to the rim when said tire is demounted.

20. A tractor wheel having a demountable tire and a plurality of adjustable tread plates cooperating therewith, said plates being adapted to be retracted within the rim of wheel when said tire is mounted thereon.

21. A tractor wheel having a raised tread adapted to normally support the load on the wheel, and a normally inoperative tread having means coacting therewith to effect a tractor tread thereon whereby to give added traction to said wheel when both treads are operative.

In testimony whereof, I affix my signature.

DAVID B. WHISTLER.